United States Patent
Schmidt

(10) Patent No.: US 8,996,216 B2
(45) Date of Patent: Mar. 31, 2015

(54) METHOD FOR OPERATING A VEHICLE ELECTRICAL SYSTEM, A CONTROLLER AND A COMPUTER PROGRAM PRODUCT

(75) Inventor: Matthias Schmidt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/813,672

(22) PCT Filed: Jun. 27, 2011

(86) PCT No.: PCT/EP2011/060709
§ 371 (c)(1),
(2), (4) Date: Apr. 5, 2013

(87) PCT Pub. No.: WO2012/019820
PCT Pub. Date: Feb. 16, 2012

(65) Prior Publication Data
US 2013/0197765 A1   Aug. 1, 2013

(30) Foreign Application Priority Data
Aug. 9, 2010 (DE) .......................... 10 2010 039 041

(51) Int. Cl.
*B60W 10/06* (2006.01)
*B60W 10/08* (2006.01)
(Continued)

(52) U.S. Cl.
CPC *B60W 30/00* (2013.01); *B60L 7/18* (2013.01); *B60L 7/26* (2013.01); *B60L 11/14* (2013.01);
(Continued)

(58) Field of Classification Search
CPC ...................... B60W 30/18127; Y10S 903/947

USPC ........................................................ 701/48, 22
See application file for complete search history.

(56) References Cited

U.S. PATENT DOCUMENTS 4,392,375 A * 7/1983 Eguchi et al. .............. 73/114.36
4,688,533 A * 8/1987 Otobe ........................... 123/337
(Continued)

FOREIGN PATENT DOCUMENTS

DE           35 25 107        2/1986
DE      10 2004 051530        5/2006
(Continued)

OTHER PUBLICATIONS

International Search Report, dated Aug. 22, 2011, issued in corresponding International Application No. PCT/EP2011/062267.

*Primary Examiner* — Behrang Badii
*Assistant Examiner* — David Testardi
(74) *Attorney, Agent, or Firm* — Kenyon & Kenyon LLP

(57) ABSTRACT

An electrical system of a vehicle includes at least one energy store, the vehicle having an internal combustion engine and electric machine mechanically coupled thereto, an actuatable accelerator pedal for predefining a torque to be output, an engine controller for injection of fuel, and an actuatable brake pedal, using which a controller is activated at least in a first partial range of its actuation, subject to first external operating conditions, so that recuperative power of the electric machine is generated at the same time that energy is fed into the electrical system. To increase the recuperation potential, the electric machine is switched to recuperative power by the controller in an operating phase in which a driver request is inferred due to actuations of the accelerator pedal, resulting in a braking power of the vehicle, the injection of the internal combustion engine being maintained due to second internal operating conditions.

20 Claims, 2 Drawing Sheets

(51) Int. Cl.
  B60W 10/192 (2012.01)
  B60W 30/18 (2012.01)
  B60W 30/00 (2006.01)
  B60L 7/18 (2006.01)
  B60L 7/26 (2006.01)
  B60L 11/14 (2006.01)
  B60W 10/30 (2006.01)
  B60W 20/00 (2006.01)

(52) U.S. Cl.
  CPC ............... B60W 10/06 (2013.01); B60W 10/08 (2013.01); B60W 30/18127 (2013.01); B60W 10/30 (2013.01); B60L 2240/423 (2013.01); B60L 2240/445 (2013.01); B60W 20/00 (2013.01); B60W 2510/0676 (2013.01); B60W 2510/068 (2013.01); B60W 2540/106 (2013.01); B60W 2540/12 (2013.01); B60W 2710/0688 (2013.01); B60W 2710/0694 (2013.01); B60W 2710/083 (2013.01); B60W 2710/086 (2013.01); Y02T 10/6286 (2013.01); Y02T 10/642 (2013.01); Y02T 10/7077 (2013.01)
  USPC .............................................. 701/22; 701/48

(56) References Cited

U.S. PATENT DOCUMENTS

| | | | |
|---|---|---|---|
| 5,469,816 A * | 11/1995 | Murakawa et al. | 123/2 |
| 5,915,801 A * | 6/1999 | Taga et al. | 303/152 |
| 6,233,508 B1 * | 5/2001 | Deguchi et al. | 701/22 |
| 6,376,927 B1 * | 4/2002 | Tamai et al. | 290/40 C |
| 6,390,214 B1 * | 5/2002 | Takahashi et al. | 180/65.26 |
| 6,651,436 B2 * | 11/2003 | Izumiura et al. | 60/708 |
| 6,709,364 B2 * | 3/2004 | Eguchi et al. | 477/174 |
| 6,785,603 B2 * | 8/2004 | Inoue | 701/112 |
| 7,036,791 B2 * | 5/2006 | Wiese | 251/129.04 |
| 7,055,635 B2 * | 6/2006 | Itoh et al. | 180/65.25 |
| 7,434,385 B2 * | 10/2008 | Ichimoto et al. | 60/277 |
| 7,587,269 B2 * | 9/2009 | Kamichi et al. | 701/110 |
| 7,715,971 B2 * | 5/2010 | Okuda et al. | 701/93 |
| 7,798,267 B2 | 9/2010 | Winkler | |
| 7,826,941 B2 * | 11/2010 | Hayashi et al. | 701/22 |
| 7,958,957 B2 * | 6/2011 | Suzuki et al. | 180/65.265 |
| 8,290,652 B2 * | 10/2012 | Niimi | 701/22 |
| 2009/0043437 A1 * | 2/2009 | Shiino | 701/22 |
| 2009/0192020 A1 | 7/2009 | Futamura et al. | |

FOREIGN PATENT DOCUMENTS

| | | | |
|---|---|---|---|
| DE | 10 2006 008642 | 8/2007 | |
| DE | 10 2007 036402 | 2/2009 | |
| DE | 10 2008 057604 | 4/2010 | |
| DE | 10 2008 061821 | 6/2010 | |
| EP | 1 420 497 | 5/2004 | |
| EP | 1 619 067 | 1/2006 | |
| FR | 2749229 A1 * | 12/1997 | ............... B60L 7/18 |
| JP | 07075394 A * | 3/1995 | ............... H02P 9/04 |
| JP | 07310566 A * | 11/1995 | ............... F02D 29/02 |
| JP | 2002315107 A * | 10/2002 | ............... B60L 11/14 |
| JP | 2003207043 A * | 7/2003 | ............... F16H 61/10 |
| JP | 2004278317 A * | 10/2004 | ............... F02D 29/02 |
| WO | WO 2010/037494 | 4/2010 | |

* cited by examiner

METHOD FOR OPERATING A VEHICLE ELECTRICAL SYSTEM, A CONTROLLER AND A COMPUTER PROGRAM PRODUCT

CROSS REFERENCE TO RELATED APPLICATIONS

The present application is the national stage entry of International Patent Application No. PCT/EP2011/060709, filed on Jun. 27, 2011, which claims priority to Application No. DE 10 2010 039 041.0, filed in the Federal Republic of Germany on Aug. 9, 2010.

FIELD OF INVENTION

The present invention relates to a method for operating an electrical system of a motor vehicle which includes at least one energy store, the motor vehicle having an internal combustion engine and an electric machine mechanically coupled thereto, an actuatable accelerator pedal for predefining a torque which may be output at least by an internal combustion engine, and an engine controller for injection of fuel into the internal combustion engine as well as, in particular, an actuatable brake pedal with the aid of which a controller is activated at least in a first partial range of its actuation, subject to first external operating conditions, so that a recuperative power between the machines is generated at the same time that energy is fed into the vehicle electrical system. The present invention also relates to a controller for an electrical system of a motor vehicle described above. The present invention furthermore relates to a computer program product.

BACKGROUND INFORMATION

It is increasingly known to use the braking energy in motor vehicles by employing, varying or increasing a generator torque of an electric machine.

German Application No. DE 10 2004 051 530 A1 describes a motor vehicle which includes a generator and a capacitor. During coasting of the motor vehicle, recuperative energy is generated by the generator as the recuperator and stored in the capacitor. To avoid excessively rapid deceleration of the vehicle in recuperation mode, which is felt to be unpleasant, the generator power is varied by an exciting current in the excitation circuit of the generator as a function of at least one vehicle-specific operating parameter and/or the instantaneous state of charge of the capacitor.

German Application No. DE 10 2007 036 402 A1 describes a method for operating an electric machine in a vehicle, the electric machine being regulated as a function of calculated, driving condition-related measured variables as a function of a driving dynamics limit range when the vehicle is in such a range, for the purpose of reducing or increasing a torque of the electric machine which functions as a generator, for stabilizing the vehicle.

German Application No. DE 10 2008 061 821 A1 describes a method for recuperating energy in a motor vehicle during a recuperative operating state in which free energy is converted into electrical power and stored in the vehicle electrical system or made available directly to a vehicle power unit, the vehicle being in the recuperative operating mode during a coasting phase and/or a braking phase. To recover a much larger amount of energy, energy recuperation is carried out without actuating the brake pedal or without active brake intervention when a driver-side or system-side deceleration request is detected resulting in a higher recuperative power compared to the recuperative power during coasting.

SUMMARY

An object of the present invention is to refine a method, a controller and a computer program product of the aforementioned type in such a way that the recuperation potential is increased without increasing the fuel consumption of the internal combustion engine.

One idea of the present invention is to convert the highest possible portion of braking energy into recuperative power to thereby increase the recuperation potential. In a simple recuperation system having a recuperative generator management system based on a 14-volt vehicle electrical system which includes a lead acid battery as the energy store, it has been previously conventionally known to increase the generator voltage and thus the battery charging power during an activated coasting cutoff. A portion of the braking energy is recovered by the vehicle during "sailing," i.e., in coasting mode and when braking. Much higher recuperative power levels are possible according to more powerful recuperation systems having a lithium ion battery or a double layer capacitor. The recuperative power is preferably controlled by the brake pedal. The condition of coasting cutoff is also used in these systems, which activate a recuperation as a function of the accelerator pedal. One idea of the present invention is to introduce and increase the recuperative power in operating phases in which the coasting cutoff is prevented or delayed due to second internal operating conditions, so-called blocking conditions.

The object is also achieved by the fact that the electric machine is switched to a recuperative power by the controller in an operating phase in which a driver request is inferred due to actuations of the accelerator pedal, resulting in a braking power of the vehicle, the injection of the internal combustion engine being maintained due to second internal operating conditions of the vehicle. Recuperation may thus take place much earlier than is presently known from the related art.

According to one preferred exemplary embodiment, recuperation takes place due to a retraction of an actuation of the accelerator pedal as the first internal operating condition. Each retraction of the actuation of the accelerator pedal is thus construed as a request by the driver to decelerate the vehicle.

According to one preferred exemplary embodiment, which is cost-effective to bring about, recuperation takes place as a function of a particular position, in particular an actuation-free "zero" position of the accelerator pedal as another first external operating condition. This makes the recuperation dependent on the position of the accelerator pedal. A particular position of the accelerator pedal is easy to detect using economical position sensors, and a control of the electric machine for operating the vehicle electrical system is thus easily implementable.

According to another preferred exemplary embodiment, recuperation takes place alternatively or additionally as a function of a dynamics of the retraction of the accelerator pedal actuation. As a result, not only the position of the accelerator pedal is relevant, but also additionally the dynamics of the retraction. A corresponding sensor system having a corresponding evaluation device is provided for this purpose.

According to another preferred exemplary embodiment, an intensity of the recuperation is made dependent on the dynamics of the accelerator pedal retraction. A higher braking power is thus achieved when the accelerator pedal is more rapidly retracted.

According to another preferred exemplary embodiment, the generator torque and thus the recuperative power are increased by the controller to an operating limit, internal second operating conditions such as, in particular, heating a catalytic converter and/or warming up the internal combustion engine being safely maintained and, in particular, the increased operating limit not causing the injection quantity to increase at any operating point time due to a recuperation. A maximum recuperation potential is thus utilized, an increase in the injection quantity not being provided or a higher generator torque not being compensated by an increase in the injection quantity for the internal combustion engine. In contrast to the related art, any electric braking power is used not only during an activated coasting cutoff. The transition to the coasting cutoff may take place during recuperation continuously and according to the related art, preferably without the driver taking any notice thereof.

According to another preferred exemplary embodiment, recuperation, in particular a higher recuperation, takes place upon detection of a coasting mode. A coasting mode is detected, for example, when the engine is dragged, i.e., when the kinetic energy is greater than the driving energy. Higher recuperation may take place, for example, by setting a higher exciting voltage of the electric machine.

The object is also achieved by a controller for an electrical system of a motor vehicle which has at least one energy store by providing a controller which interacts with the engine controller for the internal combustion engine and, in particular, includes microcomputer-based components, for the purpose of carrying out the method described above. The controller thus includes an evaluating device which measures and evaluates the sensor values of the accelerator pedal due to an accelerator pedal position or due to accelerator pedal dynamics or intensity and derives a driver request therefrom, which results in a braking power of the vehicle. According to the present invention, recuperation takes place even though fuel is injected into the internal combustion engine due to internal conditions such as heating a catalytic converter or allowing a cold engine to warm up. The controller according to the present invention may thus be used to increase the recuperation potential. According to the present invention it is not particularly important to wait for a coasting cutoff to activate a recuperation function.

The object is also achieved by a computer program product which is loadable into a program memory having provided areas for accommodating program commands of a microcomputer in a controller, for the purpose of carrying out steps of the method described above, the controller having, in particular, microcomputer-based components. A computer program product has the advantage that it is individually adaptable to vehicle types and engine types and is individually adaptable and optimizable at a later time due to empirically ascertained values or values ascertained from test series, even during vehicle operation.

It is understood that the aforementioned features and the features described below may be used not only in the particular combination specified but also in other combinations.

Exemplary embodiments of the present invention are described in greater detail below with reference to the accompanying drawings.

DETAILED DESCRIPTION

Figure 1:
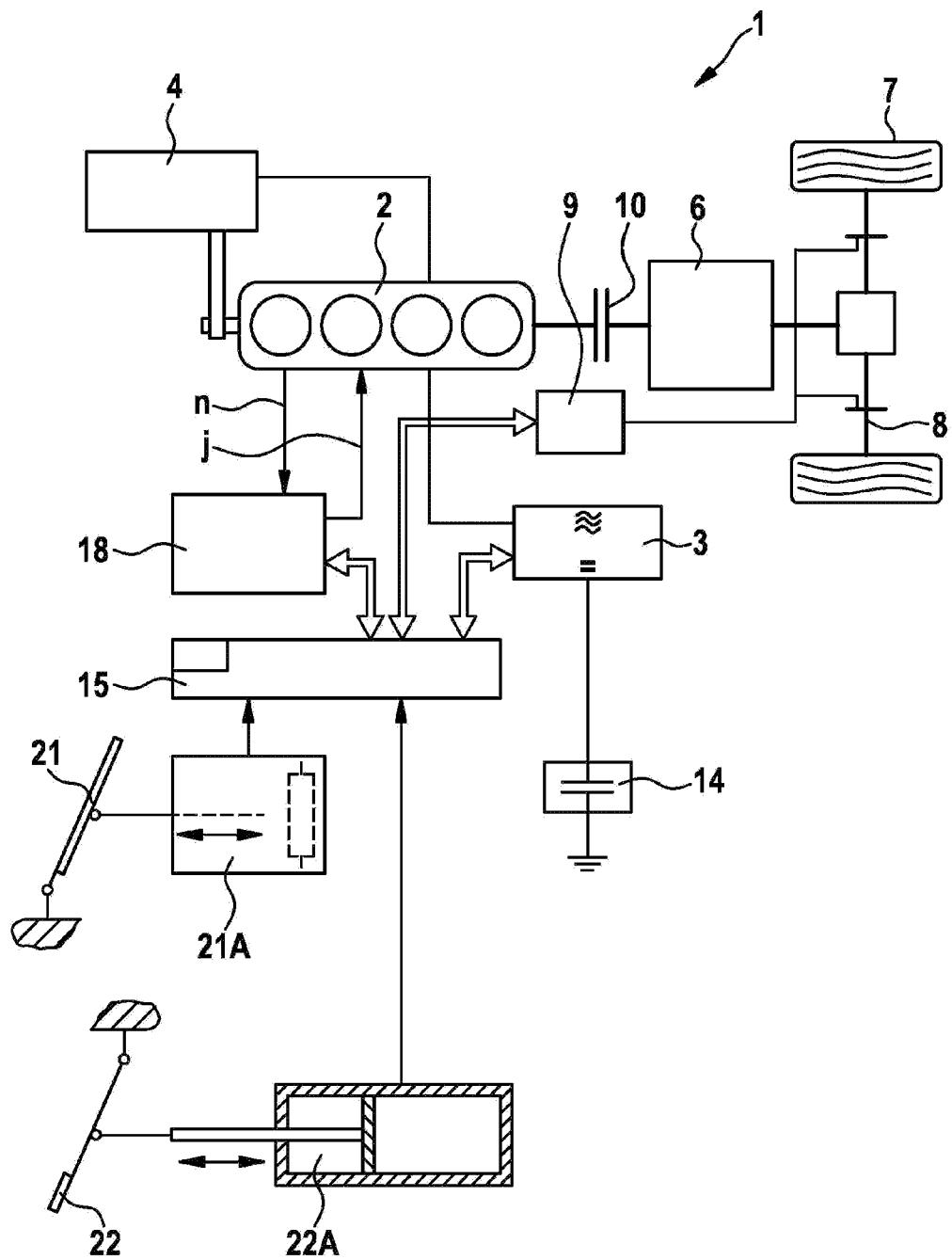
FIG. 1 shows a schematic circuit diagram of a vehicle electrical system having a drive unit and an embedded controller according to the present invention.

FIG. 1 shows a schematic circuit diagram of an electrical system of a motor vehicle 1. Motor vehicle 1 includes an internal combustion engine 2, which is mechanically coupled to an electric machine 4. Electric machine 4 is preferably a claw-pole machine. Internal combustion engine 2 is coupled to electric machine 4, for example, via a belt. A power electronic device 3 is connected between the generator and an electrical energy store 14. Power electronic device 3 includes a rectifier and a control unit, in particular a generator control unit for regulating the exciting voltage and/or the supply current or supply voltage in electrical energy store 14. Power electronic device 3 is activated by a controller 15 and is therefore part of the controller according to the present invention.

Internal combustion engine 2 drives driving wheels 7 and 8 via a clutch 10 and a transmission 6. Driving wheels 7, 8 are brakeable with the aid of a mechanical braking system 9. The transmission may be an automatic or a manually actuatable transmission.

Motor vehicle 1 furthermore includes an actuatable accelerator pedal 21 having an accelerator pedal sensor 21A and a brake pedal 22 having a brake pedal sensor 22A. Sensors 21A and 22A of accelerator pedal 21 and brake pedal 22 are connected to controller 15. Controller 15 correspondingly forwards control information of the positions of accelerator pedal 21 and brake pedal 22 evaluated by sensors 21A, 22A to engine controller 18, to power electronic device 3 of the generator and to mechanical brake controller 9. Engine controller 18 controls and regulates internal combustion engine 2 according to internal operating conditions and external operating conditions, such as driver requests which are evaluated on the basis of accelerator pedal 21 or brake pedal 22.

Engine controller 18 may be implemented as one structural unit with controller 15, or it may include two structural units, as shown in FIG. 1.

Figure 2:
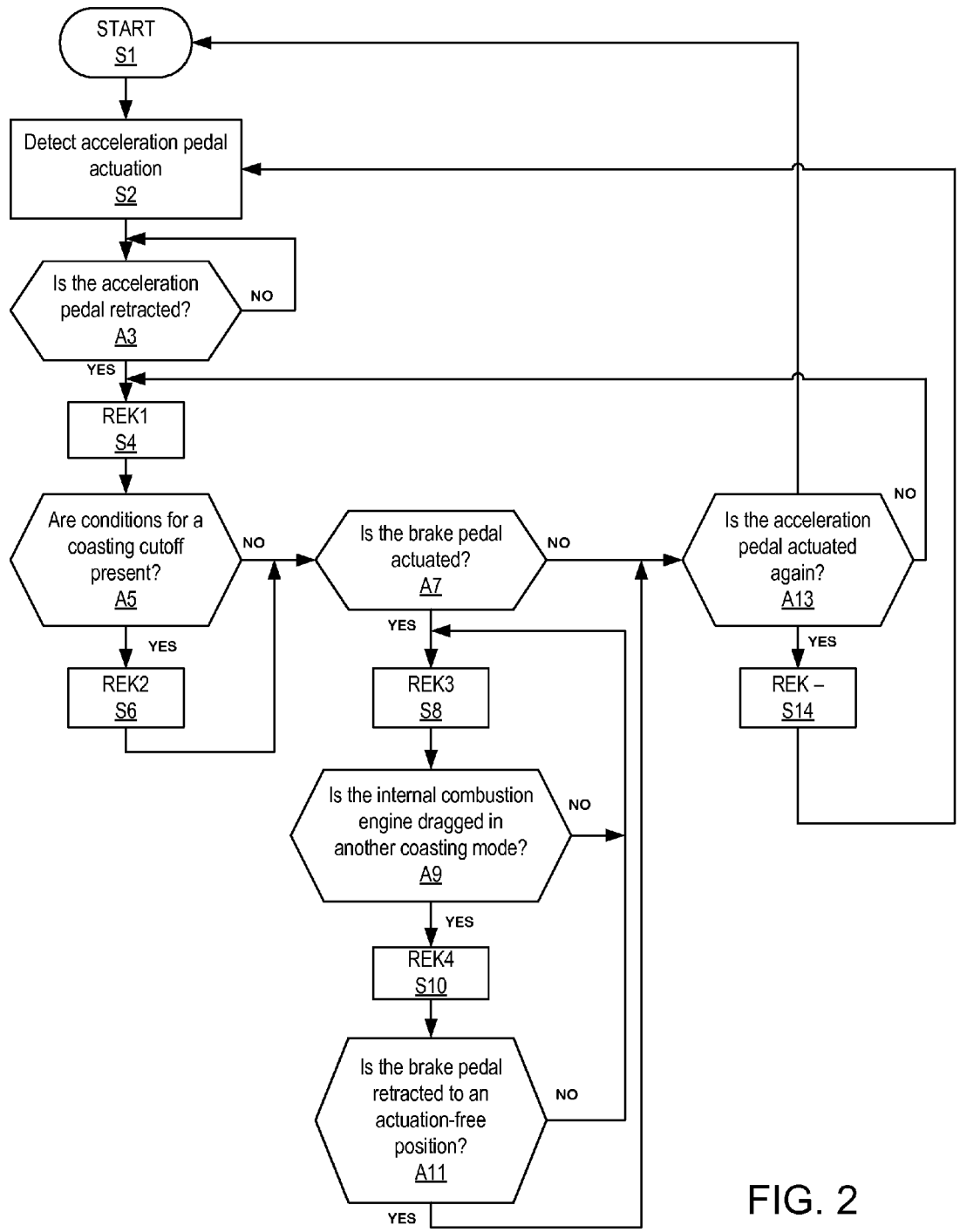
FIG. 2 shows a flow chart of a method sequence according to the present invention of the controller according to the present invention.

FIG. 2 shows a schematic flow chart, which may preferably be executed in controller 15. The controller begins to operate in step S1 at a point in time when internal combustion engine 2 has been started by a starter, which is not illustrated.

In a step S2, vehicle 1 is set in motion by actuating accelerator pedal 21, detected by sensor 21A.

Controller 15 then moves on to query step A3 and, with the aid of accelerator pedal sensor 21A, continuously queries whether accelerator pedal 21 is or is not retracted. A retraction of the accelerator pedal may include an accelerator pedal position, in particular an actuation-free "zero" position, i.e., a non-actuated position or any other position which is less than the actuated position in step S2. According to one preferred exemplary embodiment, the dynamics of the retraction of accelerator pedal 21 may furthermore be detected by sensor 21A, using an evaluating electronic device. If a retraction is not detected, query step A3 is repeated continuously.

If the response to query step A3 is positive, controller 15 switches power electronic device 3 to recuperation so that electric machine 4, as the generator, recuperates electrical energy according to a first recuperation mode Rek1. Fuel continues to be injected into internal combustion engine 2, controlled by engine controller 18, for example to heat a catalytic converter to an operating temperature or to bring internal combustion engine 2 to a warm operating temperature for the purpose of placing the internal combustion engine in an operating environment which has a low fuel consumption. Recuperation in recuperation mode Rek1 thus takes place in step S4.

The method moves on to a new query in next query step A5, which queries whether conditions for a coasting cutoff are present. This means checking whether a coasting mode is present and a coasting cutoff is carried out. The coasting cutoff is triggered, for example, after a certain time lapse, if a coasting cutoff is possible due to internal operating conditions, for example because a catalytic converter has been heated or a warm-up of the internal combustion engine is no longer necessary.

If the response to a coasting cutoff query is positive, a recuperation takes place in a second recuperation mode Rek2 in step S6. This step is already implemented and known in conventional vehicles. The recuperation gain is thus obtained, in particular, by introducing recuperation mode Rek1.

If the response to the coasting cutoff query is negative or positive, another query is carried out in step A7 independently thereof by querying brake pedal sensor 22A to see whether brake pedal 22 has been actuated.

If the response to this query is positive, a third recuperation mode Rek3 is started in a step S8, in which the recuperation torque is set even higher or varied via power electronic device 3 as a function of the intensity and force of the actuation of brake pedal 22 and, if necessary, the mechanical braking system is activated via mechanical brake controller 9 for the purpose of braking the vehicle.

Controller 15 subsequently moves on to a query step A9 to query whether the internal combustion engine is dragged in another coasting mode, so that the recuperation may be further increased compared to step S8 in a step S10 having a recuperation mode Rek4.

The queries repeat until a query is carried out in a step A11 to see whether brake pedal 22 was retracted to an actuation-free position.

If the actuation of brake pedal 22 has not yet been retracted, recuperation continues with or without a coasting mode in a recuperation mode 3 or 4.

If the brake pedal is in an actuation-free "zero" position, a check is carried out in a query step A13 to see whether accelerator pedal 21 has been actuated again.

If the response to this query is positive, the recuperation mode, which has been set accordingly, is deactivated in a step S14, and the controller returns to step S2.

If the accelerator pedal is not actuated, and if the vehicle continues to move forward, the system switches to recuperation mode Rek1.

If the accelerator pedal is not actuated in this way, and if the vehicle comes to a standstill, the controller moves on to step S1. Due to the energy management strategy proposed herein, the recuperation may thus be immediately enabled in a recuperation mode Rek1 as soon as this is possible. The recuperation potential is thus increased. This recuperation function is usable in all vehicles in all hybrid variations and stages such as mild, micro or full hybrid. Electrical energy may thus be obtained by increasing a generator torque without increasing the injection quantity. The kinetic energy for decelerating the vehicle or the potential energy from driving downhill may thus be obtained. It is no longer necessary to wait for a coasting cutoff to carry out recuperation. All figures show only schematic and not true-to-scale representations.

What is claimed is:

1. A method for operating a vehicle electrical system of a motor vehicle which includes at least one energy store, the motor vehicle having an internal combustion engine and an electric machine mechanically coupled thereto, an actuatable accelerator pedal for predefining a torque which may be output at least by the internal combustion engine, an engine controller for injection of fuel into the internal combustion engine, and an actuatable brake pedal, the method comprising:

activating a controller subject to first operating conditions, wherein by at least partially actuating the brake pedal, a recuperative power of the electric machine is generated at a same time that energy is fed into the vehicle electrical system; and switching, using the controller, the electric machine to a recuperative mode of operation, if a driver request is inferred due to an actuation of the accelerator pedal, resulting in a braking power of the vehicle, the injection of the internal combustion engine being maintained due to second operating conditions;

wherein a generator torque and thus the recuperative power are increased by the controller to a threshold torque value, the second operating conditions including at least one of a catalytic converter being below a first threshold temperature value and the internal combustion engine being below a second threshold temperature value, and the threshold torque value is defined such that an injection quantity does not increase due to recuperation.

2. The method according to claim 1, wherein the first operating conditions include a retraction of an actuation of the accelerator pedal and recuperation is carried out due to the retraction of the actuation of the accelerator pedal.

3. The method according to claim 2, wherein the recuperation is carried out as a function of dynamics of the retraction of the accelerator pedal actuation.

4. The method according to claim 3, wherein an intensity of the recuperation is made dependent on the dynamics of the accelerator pedal retraction.

5. The method according to claim 3, wherein the more rapidly the accelerator pedal is retracted, the greater the generated recuperative power.

6. The method according to claim 1, wherein the first operating conditions are a function of one of: a particular position of the brake pedal and an actuation-free "zero" position of the brake pedal, and recuperation is carried out as the function of one of the particular position and the actuation-free "zero" position of the brake pedal.

7. The method according to claim 1, wherein recuperation is at least one of carried out and increased upon detection of a coasting mode.

8. The method according to claim 1, wherein the actuations of the accelerator pedal are determined by a sensor external to the internal combustion engine.

9. The method according to claim 1, wherein the recuperation torque is varied as a function of an intensity and a force of the actuation of the brake pedal.

10. The method according to claim 1, wherein the recuperation torque is increased responsive to a determination that the internal combustion engine is dragged.

11. The method according to claim 10, wherein a total recuperation torque due to the determination that the internal combustion engine is dragged is greater than the recuperation torque that is varied as a function of an intensity and a force of the actuation of the brake pedal.

12. The method according to claim 11, wherein the recuperation torque that is varied as a function of the intensity and the force of the actuation of the brake pedal is greater than a total recuperation torque generated responsive to a determination that a coasting cutoff has been triggered.

13. The method according to claim 1, wherein the first operating conditions are triggered external to the internal combustion engine and indicated to the internal combustion engine.

14. The method according to claim 1, wherein the first operating conditions include an actuation of the acceleration pedal.

15. The method according to claim 1, wherein the first operating conditions include a degree of actuation of the brake pedal.

16. The method according to claim 1, wherein the second operating conditions are triggered by the engine controller.

17. The method according to claim 1, wherein the second operating conditions include a heating up of the catalytic converter.

18. The method according to claim 1, wherein the second operating conditions include a heating up of the internal combustion engine.

19. A controller for a vehicle electrical system of a motor vehicle which includes at least one energy store, the motor vehicle having an internal combustion engine and an electric machine mechanically coupled thereto, an actuatable accelerator pedal for predefining a torque which may be output at least by the internal combustion engine, an engine controller for injection of fuel into the internal combustion engine, and an actuatable brake pedal, with aid of which the controller is activated in a first partial range of its actuation, subject to first external operating conditions, so that a recuperative power of the electric machine may be generated at a same time that energy is fed into the vehicle electrical system, wherein the controller is configured to interact with the engine controller for the internal combustion engine, and includes microcomputer-based components for:

activating a controller subject to first operating conditions, wherein by at least partially actuating the brake pedal, a recuperative power of the electric machine is generated at a same time that energy is fed into the vehicle electrical system; and switching, using the controller, the electric machine to a recuperative mode of operation, if a driver request is inferred due to an actuation of the accelerator pedal, resulting in a braking power of the vehicle, the injection of the internal combustion engine being maintained due to second operating conditions;

wherein a generator torque and thus the recuperative power are increased by the controller to a threshold torque value, the second operating conditions including at least one of a catalytic converter being below a first threshold temperature value and the internal combustion engine being below a second threshold temperature value, and the threshold torque value is defined such that an injection quantity does not increase due to recuperation.

20. A non-transitory, computer program product which is loadable into a program memory having provided areas for accommodating program commands of a microcomputer in a controller, the computer program product being for operating a vehicle electrical system of a motor vehicle which includes at least one energy store, the motor vehicle having an internal combustion engine and an electric machine mechanically coupled thereto, an actuatable accelerator pedal for predefining a torque which may be output at least by the internal combustion engine, an engine controller for injection of fuel into the internal combustion engine, and an actuatable brake pedal, the computer program product configured to:

activate a controller subject to first operating conditions, wherein by at least partially actuating the brake pedal, a recuperative power of the electric machine is generated at a same time that energy is fed into the vehicle electrical system; and switch, using the controller, the electric machine to a recuperative mode of operation, if a driver request is inferred due to an actuation of the accelerator pedal, resulting in a braking power of the vehicle, the injection of the internal combustion engine being maintained due to second operating conditions;

wherein a generator torque and thus the recuperative power are increased by the controller to a threshold torque value, the second operating conditions including at least one of a catalytic converter being below a first threshold temperature value and the internal combustion engine being below a second threshold temperature value, and the threshold torque value is defined such that an injection quantity does not increase due to recuperation.

* * * * *